(12) United States Patent
Torre et al.

(10) Patent No.: US 10,003,510 B1
(45) Date of Patent: Jun. 19, 2018

(54) GENERATING AN ADJACENCY GRAPH FROM A SERIES OF LINEAR LINKED DATA STRUCTURES

(71) Applicant: Red Hat, Inc., Raleigh, NC (US)

(72) Inventors: Mario Torre, Hamburg (DE); Andrew Dinn, England (GB)

(73) Assignee: Red Hat, Inc., Raleigh, NC (US)

( * ) Notice: Subject to any disclaimer, the term of this patent is extended or adjusted under 35 U.S.C. 154(b) by 0 days. days.

(21) Appl. No.: 15/380,381

(22) Filed: Dec. 15, 2016

(51) Int. Cl.
 *H04L 29/08* (2006.01)
 *G06F 15/16* (2006.01)
 *H04L 12/26* (2006.01)
 *H04L 12/24* (2006.01)

(52) U.S. Cl.
 CPC ............. *H04L 43/04* (2013.01); *H04L 41/12* (2013.01); *H04L 43/045* (2013.01); *H04L 67/10* (2013.01)

(58) Field of Classification Search
 CPC ..... H04L 41/12; H04L 47/2441; H04L 45/48; H04L 43/04; H04L 43/045; H04L 45/00; H04L 45/04; H04L 67/10
 USPC ........................................................ 709/224
 See application file for complete search history.

(56) References Cited

U.S. PATENT DOCUMENTS

| | | | |
|---|---|---|---|
| 6,014,514 A | 1/2000 | Sistare | |
| 6,396,842 B1 * | 5/2002 | Rochberger | H04L 45/02 370/255 |
| 7,809,764 B2 | 10/2010 | Mak | |
| 8,336,033 B2 | 12/2012 | Schmelter et al. | |
| 8,595,702 B2 | 11/2013 | Maybee et al. | |
| 9,619,585 B2 * | 4/2017 | Futamura | G06F 17/30985 |
| 2006/0253465 A1 * | 11/2006 | Willis | G06F 17/2247 |
| 2007/0100875 A1 | 5/2007 | Chi et al. | |
| 2010/0328115 A1 * | 12/2010 | Binnig | G06F 17/30454 341/51 |
| 2012/0159449 A1 | 6/2012 | Arnold et al. | |
| 2015/0317298 A1 * | 11/2015 | Liu | G06F 17/272 707/754 |

OTHER PUBLICATIONS

Wikipedia, "Radix tree," Nov. 2016, Wikipedia.com, web.archive.org/web/20161119205559/https://en.wikipedia.org/wiki/Radix_tree.*

(Continued)

*Primary Examiner* — Ruolei Zong
(74) *Attorney, Agent, or Firm* — Lowenstein Sandler LLP (57) ABSTRACT

Implementations of the present disclosure provide for generating adjacency graph from a series of linear linked data structures. A method of one implementation includes receiving an input of a series of linear linked data structures (links). Each of the plurality of links includes an element among a plurality of elements. The method includes in response to determining that a first instance of a node among a plurality of nodes corresponding to an element among the plurality of elements does not exist in the tree graph, generating the first instance of the node in the tree graph. The method also includes creating an edge directly from a second node to the generated first instance of the node. The second node corresponds to a second element among the plurality of elements that is directly linked to the element. The method further generating an adjacency graph based on traversing of the tree graph.

20 Claims, 9 Drawing Sheets

(56) References Cited

OTHER PUBLICATIONS

Gregg, Brendan; CPU Flame Graphs, http://www.brendangregg.com/FlameGraphs/cpuflamegraphs.html; Jan. 22, 2015; 12 pages.
Graph Search; http://www.cs.princeton.edu/~rs/talks/samples.pdf; 6 pages.
Thota, Harsha Sai; "Network Traffic Analysis Using Principal Component Graphs"; http://snap.stanford.edu/mlg2013/submissions/mlg2013_submission_9.pdf; Indian Institute of Technology Guwahati, Assam, India; 2013; 8 pages.
Gregg, Brandon; The Flame Graph; ACM Queue; ACM, Inc.; Apr. 20, 2016, vol. 14, Issue 2; http://queue.acm.org/detail.cfm?id=2927301; 23 pages.
Flame Graphs; http://www.brendangregg.com/flamegraphs.html; 7 pages.

* cited by examiner

GENERATING AN ADJACENCY GRAPH FROM A SERIES OF LINEAR LINKED DATA STRUCTURES

TECHNICAL FIELD

The implementations of the disclosure relate generally to graph structures of computing devices and, more specifically, relate to generating an adjacency graph from a series of linear linked data structures.

BACKGROUND

A linked list is a linear data structure implemented by a computing device. The linked list may refer to a group of nodes in a sequence, which is divided in two parts. Each node consists of its own data and directly points to the next node and forms a chain. Linked lists are used to create trees and graphs.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Implementations of the present disclosure provide for generating an adjacency graph from a series of linear linked data structures.

Conventional systems for generating adjacency graphs include generating a tree graph of nodes representing each of the data structures in a linked list A layout, such as an adjacency graph, is then generated based on the tree graph and any information associated with the nodes of the tree graph. However, in the conventional systems, every time a new link of a data structure is received as an input to be processed, the tree graph is traversed again to update the tree graph, and the adjacency graph is regenerated based on this updated tree graph. Such traversing of the graph on every new link can be time consuming and can utilize additional storage overhead. In addition, the adjacency graph is recomputed based on this updated tree graph, consuming additional processing resources. Furthermore, the adjacency graph tends to increase in size every time it is recomputed, consuming additional storage resources.

Implementations of the disclosure postpone the computing of the adjacency graph while still allowing an update of the tree graph. Also, implementations of the disclosure generate an adjacency graph and tree graph that are more compact in size than those generated by conventional systems. In one implementation, an input of links of data structures containing elements is received and each of the elements is processed for mapping to a node in a tree graph, Each of the elements contain its own data and is linked to another element in the link. In one implementation, the links that contain a same ordered sequence of elements are mapped to the same nodes. As a result, the same nodes are not generated again in the tree graph, thus resulting in a compact tree graph. In addition, the mapping preserves a parent-child relationship present in the inputs, such that each node in the tree graph identifies its corresponding parent node and an edge from the parent node to the node (child node). The parent node is an ancestor to the node (child node) and the child node is a descendant to the parent node. Therefore, every time a new link of elements is received, these elements in the new link utilize little to no processing when they have been encountered in the previous links and have already been processed.

In one implementation, each of the nodes is associated with a count of the elements mapped to the corresponding tree node such that a count value of the node is incremented upon encountering of the corresponding element in the link. In one implementation, regardless of whether the node is generated in the tree graph, the count value of each of the nodes is incremented at every instance an element in the link corresponding to the node in the graph is encountered.

In one implementation, the graph traversal is conducted only once each time an adjacency graph is recomputed to identify all of the parent and child nodes and the edges from the parent node to the child node in the resulting tree graph. In addition, since the resulting graph is more compact in size than those generated by conventional methods, requires proportionally less computation of steps to conduct the graph traversal. In one implementation, a plurality of adjacency lists is generated based on the graph traversal. Each of the adjacency lists includes identification of one or more nodes in the graph and a corresponding common depth value, which defines a position of the one or more nodes in the graph. Each of the adjacency lists is sorted based on information stored for the one or more nodes. In one example, such information includes a count value for the one or more nodes among the plurality of nodes. In another example, such information includes a name identifier assigned to the one or more nodes among the plurality of nodes. An adjacency graph is generated based on each of the sorted adjacency lists.

Figure 1:
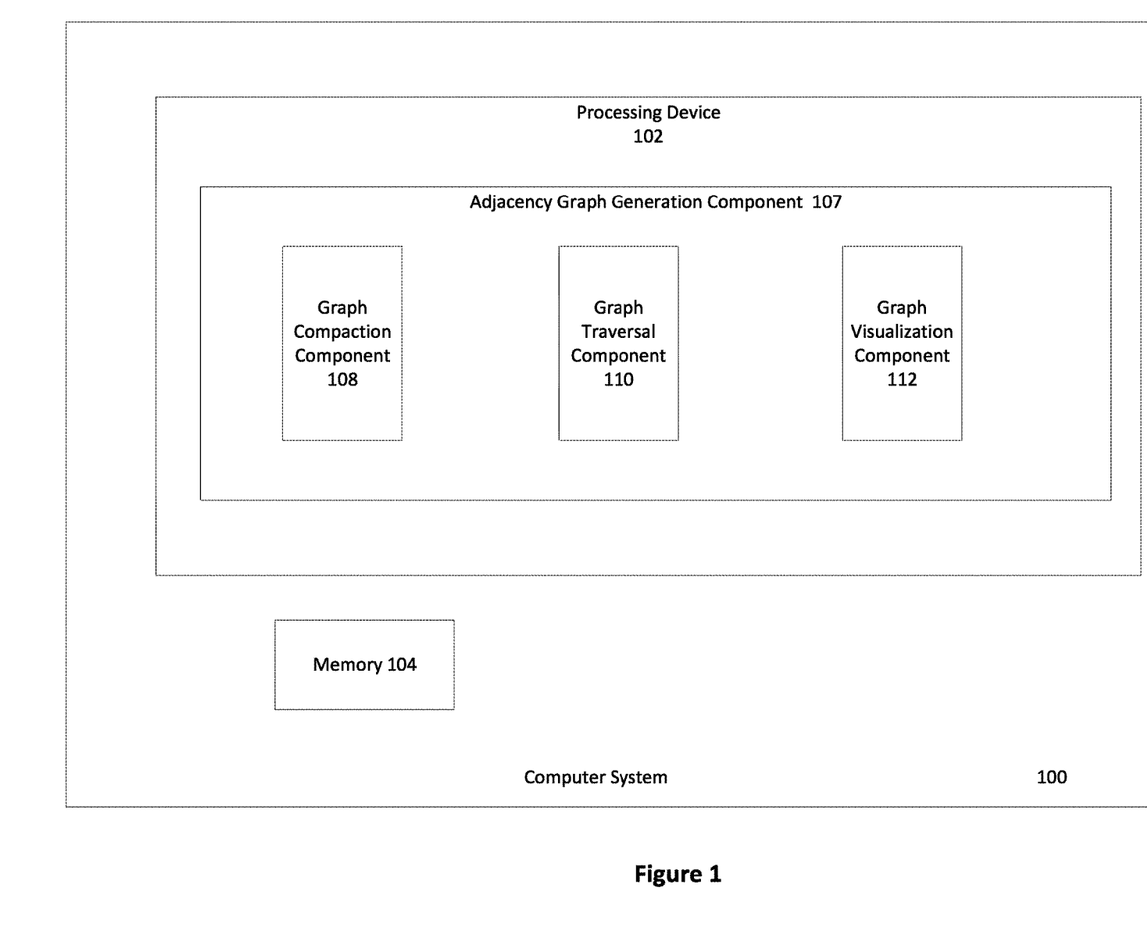
FIG. 1 illustrates a block diagram of a computer system in which the implementations of the disclosure may operate.

FIG. 1 is a block diagram illustrating a computer system 100 in accordance with one or more implementations of the present disclosure. In one implementation, the computer system 100 may be a machine such as, for example, any variety of user devices, such as a personal computer (PC), a laptop, a mobile phone, mobile smart phone, a tablet computer, handheld devices, netbooks, or any other computing device. Furthermore, computer system 100 may comprise a server device, such as a mainframe server device or any other type of server device.

The computer system 100 may include a processing device 102 such as, for example a central processing unit (CPU) that may execute the program code of software applications. The computer system 100 may also include storage devices such as, for example, a memory 104 and/or hard disks that may store the program code of these software applications. The processing device 102 is operatively coupled to the memory 104.

In one implementation, the processing device 102 includes an adjacency graph generation component 107 to generate adjacency graph from a series of linear linked data structures. In one implementation, the adjacency graph generation component 107 includes a graph compaction component 108, a graph traversal component 110, and a graph visualization component 112, details of each are provided herein below.

In one implementation, the graph compaction component (GCC) 108 receives an input of a series of linear linked data structures (links) and processes the links to generate a compacted tree graph (tree graph). A linear linked data structure is a linear collection of a group of data trace elements (elements) each pointing to the next element. Each element is composed of data and a link to the next element in a sequence. In one example, the series of links are a series of stack back traces. Each of the stack back traces records a list of functions or methods calls that are active at some point during program execution. In one implementation, the links are stored in a memory 104. In one implementation, the GCC 108 may retrieve the links from the memory 104

In one implementation, the GCC 108 linearly scans every element in each of the series of the links. The GCC 108 sequentially scans every element in the link in a straight line starting with the first element in the link to the next element and so forth. In one implementation, the GCC 108 references the tree graph to determine whether a node exists for each of the elements in each of the links. The tree graph includes at least a root node. The tree graph may or may not include other nodes besides the root node. The GCC 108 creates an edge between the node and the root node in the tree graph if the element is the first element in the link. In this example, the node is a parent node. In one implementation, each node in the tree graph includes parent-child relationship identifying the parent node of the corresponding node based on an edge between the parent node and the corresponding node (child node). In one implementation, an element "X" in the link is assimilated to a specific node with the "X" in the tree graph if the ancestor elements in the link have been mapped in the same order to like-named ancestor nodes in the tree graph. Details of the implementation are provided below.

In one implementation, when GCC 108 encounters an element for the first time in the link, the GCC 108 determines that a node does not exist in the tree graph for that element. The GCC 108 creates the node in the tree graph for that element in the link and also creates an edge between the node and a first node that corresponds to a first element directly linked to the element in the link. In one implementation, the GCC 108 assigns a count value of 1 to the node when the corresponding element is first encountered in the link.

In one implementation, when GCC 108 encounters the same element again in the same link or a different link, the GCC 108 checks the tree graph to determine whether an edge exists between the node corresponding to the same element and a second node, which corresponds to a second element in the link that is directly linked to the same element in the link. If it is determined that such edge does exists, then the tree graph is not edited or updated. In one implementation, the GCC 108 increments the count value of the node corresponding to the same element by 1. In one implementation, if it is determined that the edge does not exist, the tree graph is edited. In one implementation, a new node corresponding to the same element is created in the tree graph and also an edge is created between the new node and the second node. In one implementation, the GCC 108 assigns a count value of 1 to the new node corresponding to the same element. As such, the GCC 108 generates the tree graph representing all the elements in the series of links.

In one implementation, the GCC 108 stores the count value of the nodes in the corresponding nodes in the tree graph. In one implementation, each of the elements includes a unique name identifier assigned to identify the element. In one implementation, the GCC 108 assigns the name identifier of the element to the corresponding node in the tree graph and stores the name identifier in the corresponding node in the tree graph.

In one implementation, each of the elements in the link also includes a depth value, which defines a position of each element in the link. The depth value of the first element in the link is 1. The depth value of all other elements in the link is the distance between each of the other elements and the first element in the link. In one implementation, the GCC 108 stores the depth value of the element in the corresponding node in the tree graph.

Figure 2A:
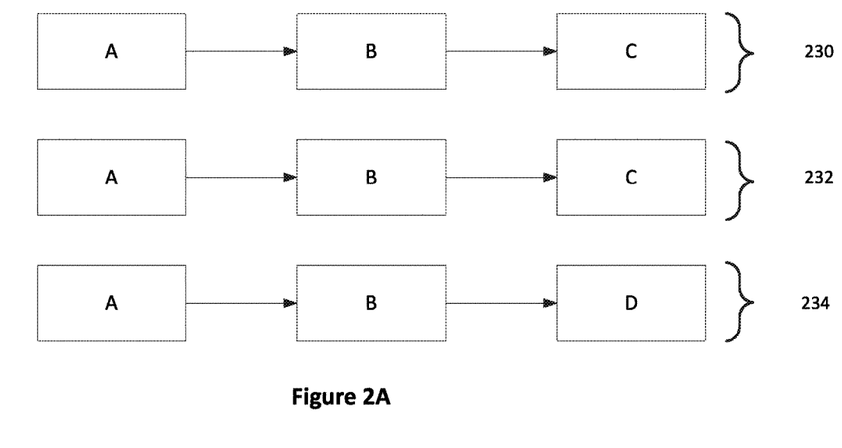
FIG. 2A illustrates an example of an input of series of links in accordance with an implementation of the disclosure.

FIG. 2A shows an example of an input of a series of links including a first link 230, a second link 232, and a third link 234. The first link 230 includes trace elements identified by the name identifiers, A, B and C, the second link 232 includes trace elements identified by the name identifiers A, B and C and the third link 234 includes trace elements identified by the name identifiers A, B and D. Each of these series of links is processed by the GCC 208 to generate the tree graph.

The tree graph initially contains one node, which is a root (parent) node that has a depth value of 0. In one implementation, elements A, B, and C are scanned in the first link 230. Element A is scanned first in the first link 230 to look up in the tree graph (300 of FIG. 3) to determine if a node already exists for the element A. Since, initially the tree graph (300 of FIG. 3) contains the root node (301 of FIG. 3), it is determined that a node does not exist in the tree graph for the element A in the first link 230. Node A (302 of FIG. 3) is created in the tree graph (300 of FIG. 3) and an edge is created from the root node to the node A. A count value of 1 is assigned to the element A and stored as the count value of 1 in the corresponding node A Similarly, element B is scanned next to determine that a node does not exist in the tree graph (300 of FIG. 3) for the element B. Node B (304 of FIG. 3) is created in the tree graph and an edge is created from the node A to the node B in the tree graph. A count value of 1 is assigned to the element B and stored as the count value of 1 in the corresponding node B. Similarly, an element C is scanned next in the tree graph (300 of FIG. 3) to determine that a node does not exist in the cache 106 for the element C. N Node C (306 of FIG. 3) is created in the tree graph and an edge is created from the node B to the node C in the tree graph. A count value of 1 is assigned to the element C and stored as the count value of 1 in the correspond node C.

In one implementation, the second link 232, containing elements A, B, and C are scanned. Element A is scanned first to determine that node A (302 of FIG. 3) already exists in the tree graph for the corresponding element A. The count value of the node A is incremented by 1, resulting in the count value of the node A stored as the value 2 in the corresponding node A. No new node A is generated and no new edge is created from the root node to the node A as the edge is already created in the tree graph based on the first link, 230. Similarly, Element B is scanned next to determine that node B (304 of FIG. 3) already exists in the tree graph for the corresponding element B. The count value of the node B is incremented by 1, resulting in the count value of the node B to be 2 in the corresponding node B. No new node B is generated and no new edge is created from the node A to node B as such an edge is already created in the tree graph based on the first link 230. Similarly, Element C is scanned next to determine that node C (306 of FIG. 3) already exists in the tree graph for the corresponding element C. The count value of the node C is incremented by 1, resulting in the count value of the node C stored as the value 2 in the corresponding node C. No new node C is generated and no new edge is created from the node B to the node C as such an edge is already created from the node B to the node C and the node B based on the first link 230.

In one implementation, the third link 234 containing elements A, B, and D are scanned. Element A is scanned first to determine that node A already exists in the tree graph for the corresponding element A. The count value of the node A is incremented by 1, resulting in the count value of the node A to be 3 in the corresponding node A 302. Similarly, Element B is scanned next to determine that node B already exists in the tree graph for the corresponding element B. The count value of the node B is incremented by 1, resulting in the count value of the node B to be 3 in the corresponding node B 304. Element D is scanned next to determine that a node does not exist in the tree graph for the element D in the third link 234. N Node D (308 of FIG. 3) is created in the tree graph and an edge is created between from the node D to the node B in the tree graph as such an edge does not exist based on the previous first and second links 230 and 232 respectively. A count value of 1 is assigned to the element D and stored as the count value of 1 in the corresponding the node D.

Figure 2B:
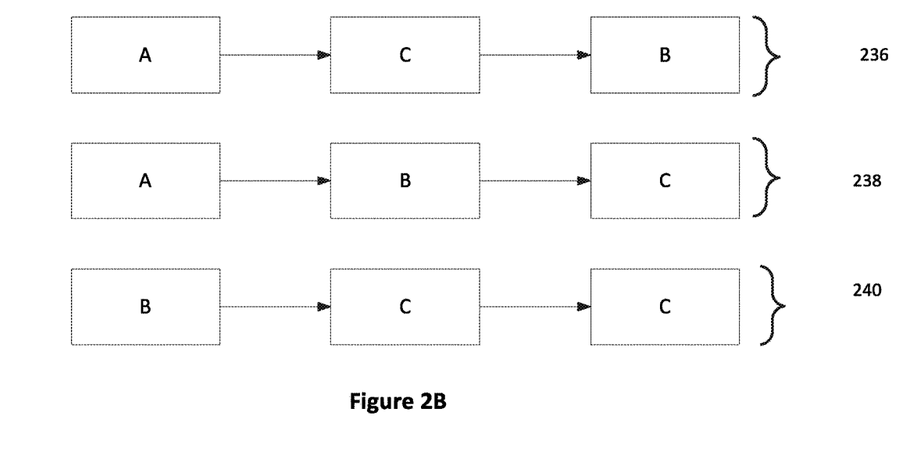
FIG. 2B illustrates an example of a series of additional links in accordance with an implementation of the disclosure.
Figure 3:
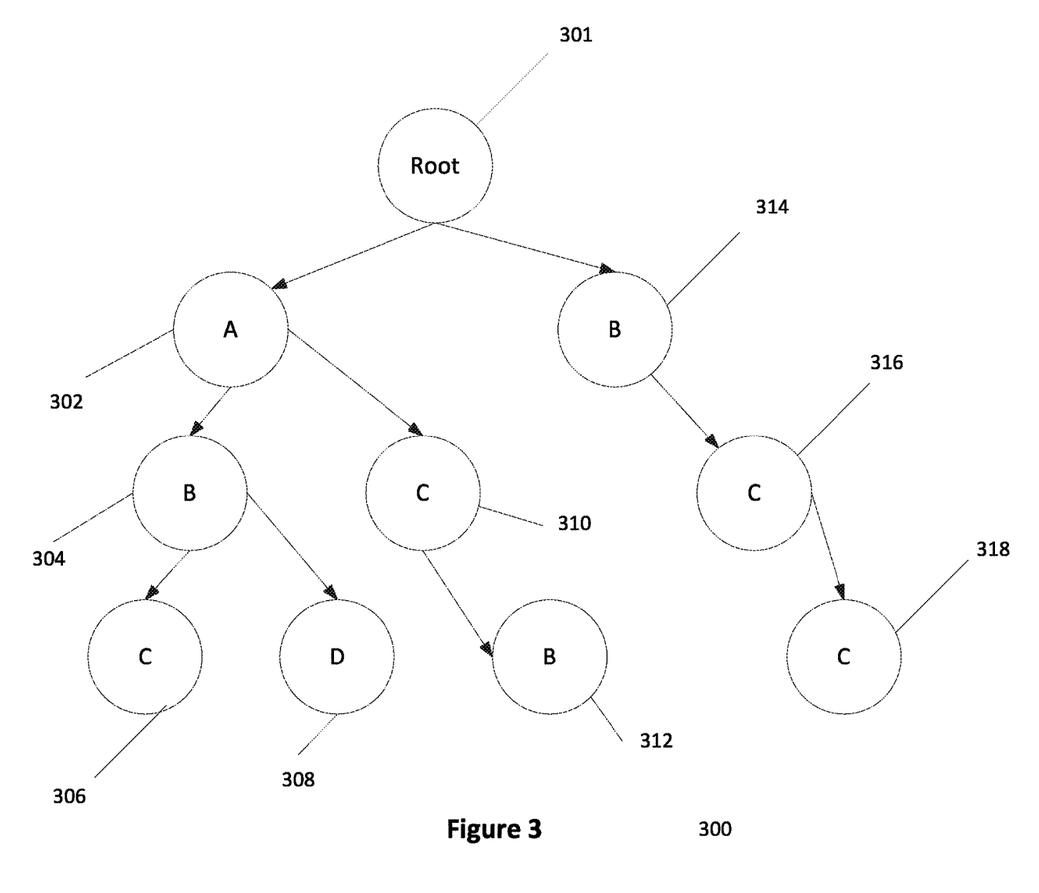
FIG. 3 illustrates an example of a tree graph in accordance with an implementation of the disclosure.

FIG. 2B shows an example of a series of additional links including a fourth link 236, a fifth link 238 and sixth link 238 inputted into the GCC 208. These additional links are new links that would cause an update on the nodes on the tree graph 300 of FIG. 3. Accordingly, the tree graph 300 of FIG. 3 is not computed until all the additional links have been processed. The fourth link 236 includes trace elements identified by the name identifiers A, C, and D. The fifth link 238 includes trace elements identified by the name elements A, B, and C and the sixth link 240 includes trace elements identified by the name elements A, C, and C. Each of these series of links is processed to update the tree graph In one implementation, the fourth link 236 containing elements A, C, and B are scanned. Element A is scanned first to determine that node A 302 already exists in the tree graph for the corresponding element A. The count value of the node A is incremented by 1, resulting in the count value of the node A to be 4 in the corresponding node A 302. Similarly, element C is scanned next to determine that a corresponding node C does not exist in the tree graph 300 since this element C is linked from element A. Therefore, a new node C, also called a first node C (310 of FIG. 3) is generated in the tree graph and an edge is created from the node A to the node C as no such edge from the node A to the node C exists in the tree graph. A count value of 1 is assigned to the element C in the fourth link 236 and stored as the count value of 1 in the corresponding to the first node C 310. Similarly, element B is scanned next to determine that a corresponding node B does not exist in the tree graph 300 since this element B is linked from element C. Therefore, a new node B, also called a first node B (312 of FIG. 3) is generated in the tree graph and an edge is created between from first node B (312 of FIG. 3), and the first node C (310 of FIG. 3) in the tree graph as no edge from the first node C to the first node B exists in the tree graph. A count value of 1 is assigned to the element B in the fourth link 236 and stored as the count value of 1 in the corresponding first node B 312.

In one implementation, the fifth link 238 containing elements A, B, and C are scanned. In this scenario, fifth link 238 is same as the second link. As such, no edges are created in the tree graph and the count values of each of the nodes A, B, and C are incremented by 1. This results in the count value of the node A 302 to be 5, the node B 304 to be 4, and the node C 306 to be 3.

In one implementation, the sixth link 240 containing elements B, C, and C are scanned. Since, the element B is the first data element in the sixth link 240, element B is scanned first to determine that a corresponding node B does not exists in the tree graph 300 since this element B is the first element in the link. Therefore, a new node, also called a second node B (314 of FIG. 3) is generated in the tree graph. Since element B is the first element in the link it is determined that the second node B (314 of FIG. 3) is a parent node An edge is created from the root node to the second node B 314 of FIG. 3 as no edge from the root node to the second node B exists in the tree graph. A count value of 1 is assigned to the element B in the sixth link 240 and stored as the count value of 1 corresponding to the second node B in the cache 106.

Second Element C is scanned next in the sixth link 240 to determine that a corresponding node C does not exist in the tree graph 300. Even though, element C is linked from element B as in the previous links, this time element B corresponds to the second node B, which is a parent node. Therefore, a new node C, also called a second node C (316 of FIG. 3) corresponding to this element C in the sixth link 240 an is generated in the tree graph and another edge is created from the second node B (314 of FIG. 3) to the second node C (316 of FIG. 3). A count value of 1 is assigned to the element C in the sixth link 240 and stored as the count value of 1 in the corresponding second node C 316.

The third element C in the sixth link 240 is scanned next to determine that a corresponding C does not exist in the tree graph 300. Therefore, a new node C, also called a third node (318 of FIG. 3) is generated in the tree graph and another edge is created from the second node C (316 of FIG. 3) to the third node C (318 of FIG. 3) in the tree graph since no such edge from the second C to the third node C exists in the tree graph. A count value of 1 is assigned to this third element C in the sixth link 240 and stored as value of 1 in the corresponding third node 318, In one implementation, an example of the resulting tree graph 300 for an input of a series of links of FIG. 2A and a series of the additional links of FIG. 2B as processed is illustrated in FIG. 3. As shown, the resulting tree graph 300 includes the node A 302, node B 304, the first node B 312, the second node B 314, the node C 306, the first node C 310, the second node C 316, the third node C 318 and the node D 308 and their corresponding edges. A root node 301 is a parent node to the node A 302 (child node) and the second node B 314 (child node). The node A 302 node is a parent node to the node B 304 (child node) and the first node C 310 (child node). The node B 304 is the parent node to the node C 306 (child node) and the node D 308 (child node). The first node C 310 is a parent to the first node B 312 (child node). The second node B 314 is a parent to the second node C 316 (child node). The second node C 316 is a parent to the third node C 318 (child node).

Referring back to FIG. 1, the graph traversal component 110 traverses the resulting graph to generate topological information of the resulting tree graph. The graph traversal component 110 traverses the resulting tree graph to identify the edges and, based on the identified edges, searches the corresponding parent-child nodes in the tree graph. As discussed above, each node includes the name identifier of the node, count value of the node, the depth of the node, the edges of the node, and the parent corresponding to the edges. As such, a parent node is immediately accessible for every node in the resulting graph. In one implementation, the topological information includes a plurality of adjacency lists generated based on the depth value of each node.

Specifically, a first adjacency list includes a root node and its corresponding depth value of 0. A second adjacency list includes one or more parent nodes, such as the node A and the second node B of the resulting graph in FIG. 2, with its corresponding depth value of 1. A third adjacency list includes one or more first child nodes, such as node B (corresponding parent node A), the first node C (corresponding parent node A and the second node C (corresponding parent second node B) in FIG. 2, each of these have a depth value of 2. A fourth adjacency list includes one or more second child nodes, such as node C (corresponding parent node B), node D (corresponding parent node B), the first node B (corresponding parent first node C) and third node C (corresponding parent second node C), each of these have a depth value of 3. In one implementation, the topological information and the information stored in the nodes is utilized for final plotting of an adjacency graph as described in detail below.

Referring back to FIG. 1, the graph visualization component 112 generates a visual representation of the resulting tree graph to generate an adjacency graph. The visual operation may include sorting of the nodes in each of the adjacency lists. In one example, the nodes in each of the adjacency lists are sorted based on the information stored for the corresponding nodes in the tree graph. In one example, the nodes in each of the adjacency lists are sorted based on the name identifier of each of the nodes in the tree graph. In another example, the nodes in each of the adjacency lists are sorted based on the count value of each of the nodes in the tree graph. As discussed above, the adjacency graph includes a root (a.k.a. parent) node, one or more parent nodes and one or more child nodes. In one implementation, the adjacency graph is generated such that the one or more child nodes are always aligned and centered over the parent node. In one implementation, the adjacency graph is generated such that weight (i.e. a measure of allocation of the available space) assigned to one or more child nodes adds up to the weight of the parent node, details of which are provided below with respect to FIGS. 4A and 4B as discussed herein below.

Figure 4A:
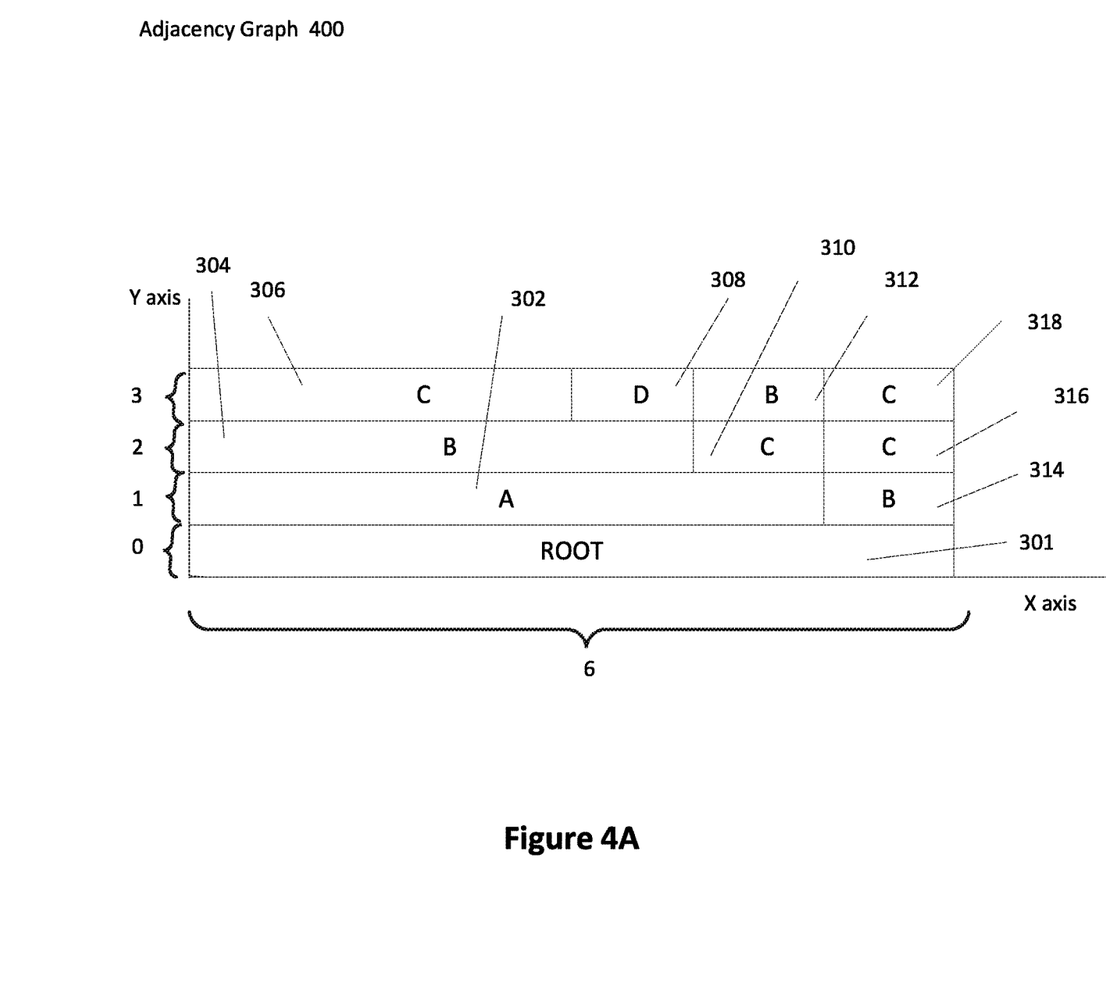
FIG. 4A illustrates an example of an adjacency graph in accordance with an implementation of the disclosure.

In one implementation, the graph visualization component 112 scans each of the adjacency lists by depth and access the count value of each of the nodes in the list. The graph visualization component 112 creates an adjacency graph with a y-axis assigned with a depth value and the x-axis assigned with a normalized count value, i.e. weight as described above. In addition, each of nodes are aligned over their parent nodes in the adjacency graph. FIG. 4A illustrates an example of the adjacency graph 400 generated based on the adjacency lists sorted by the count value of the nodes with weights assigned proportionally to each node relative on their sibling node. The y-axis includes the depth values of 0, 1, 2, and 3. The x-axis includes a normalized count value of X. As shown, the depth value of 0 includes the root node 301, which is derived from the first adjacency list which includes the total normalized count value of 6. The depth value of 1 includes node A 302 and the second node B 314, which are derived from the second adjacency list. In addition, the node A 302 and the second node B 314 is aligned above their parent node, i.e. the root node, which is retrieved from the parent child relationship stored in the node A 302 and the second node B 314. The normalized count value for node A 302 is a fraction of the count value X and the ⅝, which is a fraction of the count value X from the node divided by the total normalized count value 6 and the total normalized count value for the second node B 314 is ⅙ of the total normalized count value of 6. Further, the weight of the root node 301 is divided between the node A 302 and the second node B 314 such that the weight of the node A 302 is larger than the weight of the second node B 314.

The depth value of 2 includes the node B 304, the first node C 310 and the second node C 316, which are derived from the third adjacency list. Also, the node B 304 and the first node C 310 is aligned above their parent node, i.e. the node A 302 and the second node C 316 is aligned above its parent node, i.e. the second node B 314, which are retrieved from the parent child relationship stored in the node B 304, the first node C 310 and the second node C 316. The normalized count value for node B 304 is ¾*⅝ and the normalized count value for the first node C 310 is ¼*⅝. The normalized count value for the second node C 316 is ⅕th of the space as its count is irrelevant since there is no other node to divide the space up with the second node C 316. Further, the weight of the node A 302 is divided between the nodes B 304 and the first node C 310 and the weight of the second node B 314 is equally assigned to the second node C 316 since the second node C 316 is the only child node to the second node B 314.

The depth value of 3 includes the node C 306, the node D 308, the first node B 312 and the third node C 318, which are derived from the fourth adjacency list. Also, the node C 306 and the node D 308 is aligned over their parent node, i.e. the node B 304, the first node B 312 is aligned over its parent node, i.e. the first node C 310 and the third node C 318 is aligned over its parent node, i.e. the second node C 316, which are retrieved from the parent child relationship stored in the node C 306, the node D 308, the first node B 312 and the third node C 318. The normalized count value for node C is ½*¾*⅝ and the normalized count value for the node D 308 is also ½*¾*⅝. The normalized count value of the first node B 312 will be same as the first node C 310 and the normalized count value of the third node C 318 is same as the second node C 316. Further, the weight of the node B 304 is divided between the nodes C 306 and the node D 308; the weight of the first node C 310 is equally assigned to the first node B 312 since the first node B 312 is the only child node to the first node C 310; and the weight of the second node C 316 is equally assigned to the third node C 318 since the third node C 318 is the only child node to the second node C 316.

Figure 4B:
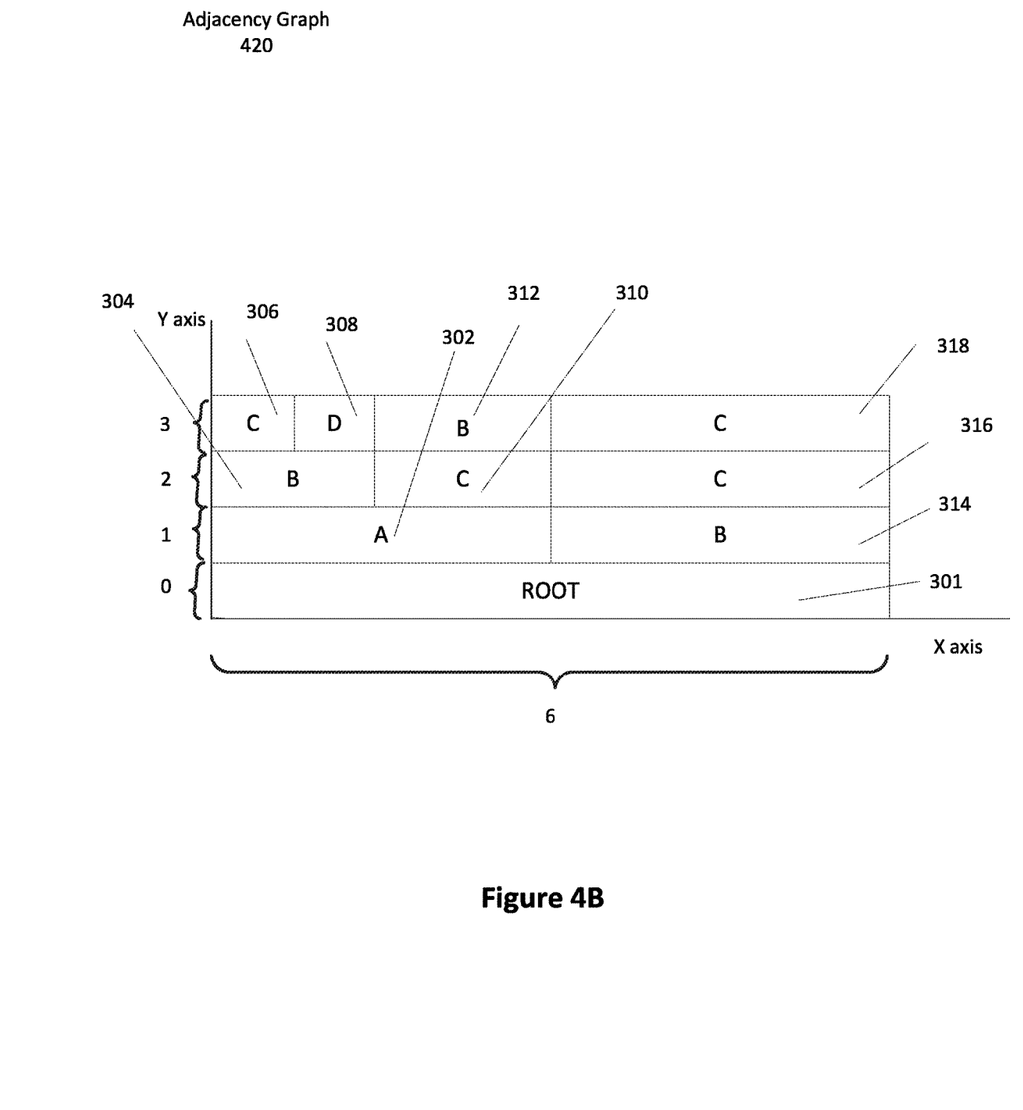
FIG. 4B illustrates an example of an adjacency graph in accordance with another implementation of the disclosure.

Although, the implementation described above with respect to FIG. 4A is for the adjacency graph generated based on the count value of the nodes, it is appreciated to one skilled in the art that the adjacency graph may be generated using other properties. In one implementation, the adjacency graph may be based on adjacency lists sorted by the count value of the nodes with weights assigned proportionally equal to each node relative on their sibling node as illustrated in FIG. 4B. FIG. 4B shows an example of the adjacency graph 420 generated based on the adjacency lists sorted based on count value of nodes with weights of each parent node assigned proportionally equal to each of the child nodes. The y-axis includes the depth values of 0, 1, 2, and 3 and the x-axis includes a normalized count value of X similar to FIG. 4A. As shown, weight of each of the parent node is divided equally between the child nodes. For example, the weight of the node A 302 is divided equally between the node B 304 and the first node C 310. In another example, the weight of the second node B 314 is fully assigned to the second node C 316 since the second node C 316 is the only child node to the second node B 314.

Figure 5:
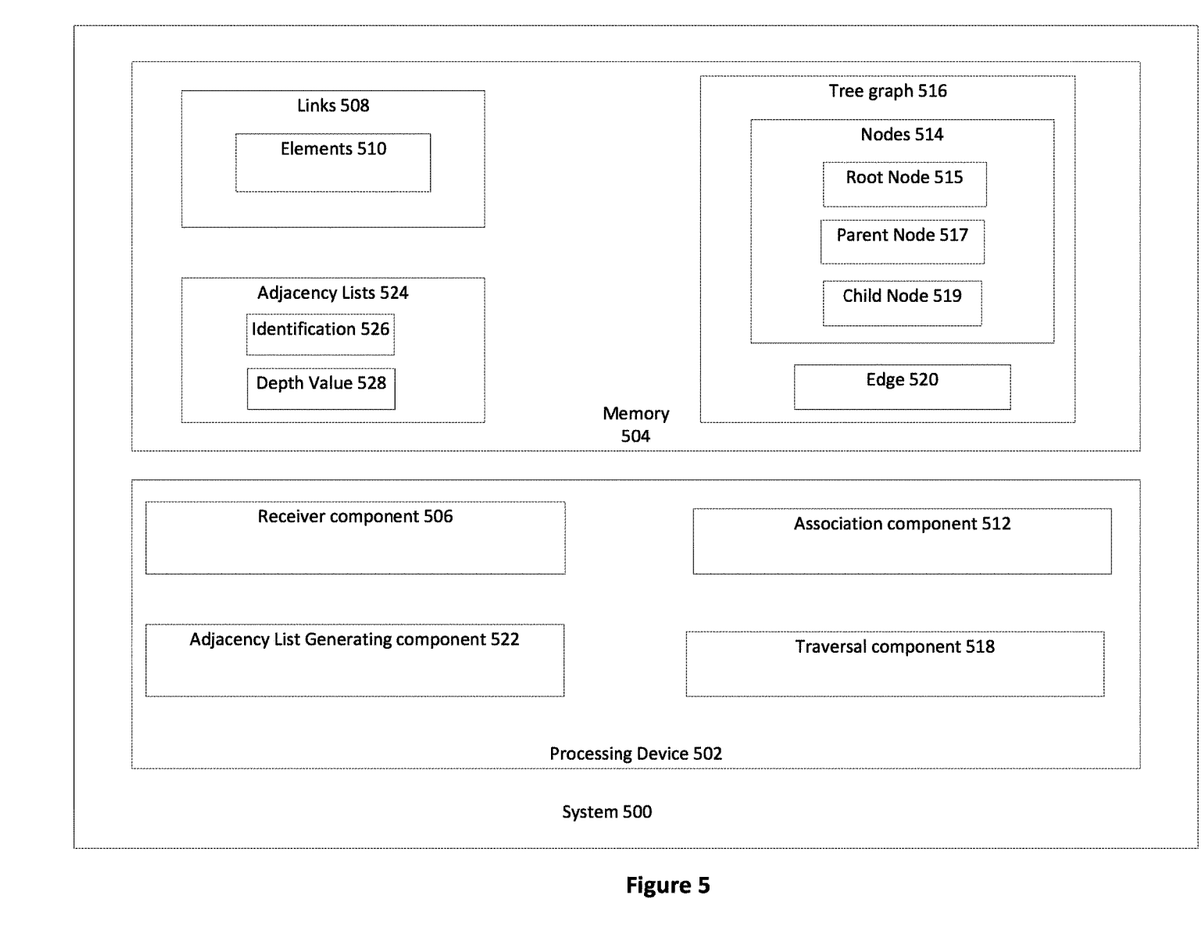
FIG. 5 illustrates an example of a system in accordance with an implementation of the disclosure.

FIG. 5 illustrates an example of a system 500 including a processing device 502 operatively coupled to a memory 504 in accordance of one or more implementations of the disclosure. In some implementations, the processing device 502 may be provided by one or more processors, such as a general-purpose processor, for executing instructions. The memory 504 may include a volatile or non-volatile memory device, and other types of computer-readable medium, or combination thereof that is capable of storing relevant data related to the functions and instructions for carrying out the operations of the system 500.

In one implementation, the processing device 502 includes a receiver component 506 to receive an input of a series of linear linked data structures (links) 508 stored in the memory 504. Each of the plurality of links 508 include a plurality of elements 510. The processing device 502 may also include an association component 512, which associates each of the plurality of elements 510 with a node among the plurality of nodes (nodes) 514 in a tree graph 516 stored in the memory 504. In one implementation, the processing device 502 includes a traversal component 518 that traverses the tree graph 516 to identify an edge 520 in the tree graph 516 for each of the plurality of nodes 514 in the tree graph 516. The edge 520 is a direct link originating from a parent node 517 among the plurality of nodes 514 to a node among the plurality of nodes 514. As discussed above, the parent node 517 is an ancestor to the node, and the node is a descendant to the parent node 515. In one implementation, the processing device 502 also includes a adjacency list-generating component 522 that generates a plurality of adjacency lists 524 in view of the traversing of the tree graph 516. The adjacency lists 524 are stored in the memory 504. Each of the plurality of adjacency lists 524 may include identification 526 of one or more nodes among the plurality of nodes 514 and a depth value 528 of the one or more nodes among plurality of nodes 514. The one or more nodes among the plurality of nodes 514 may include one of a root node 515, the parent node 517 or a child node 519, the root node 515 being a top node in the tree graph 516, and the child node 519 is a descendant to the parent node 517.

Figure 6:
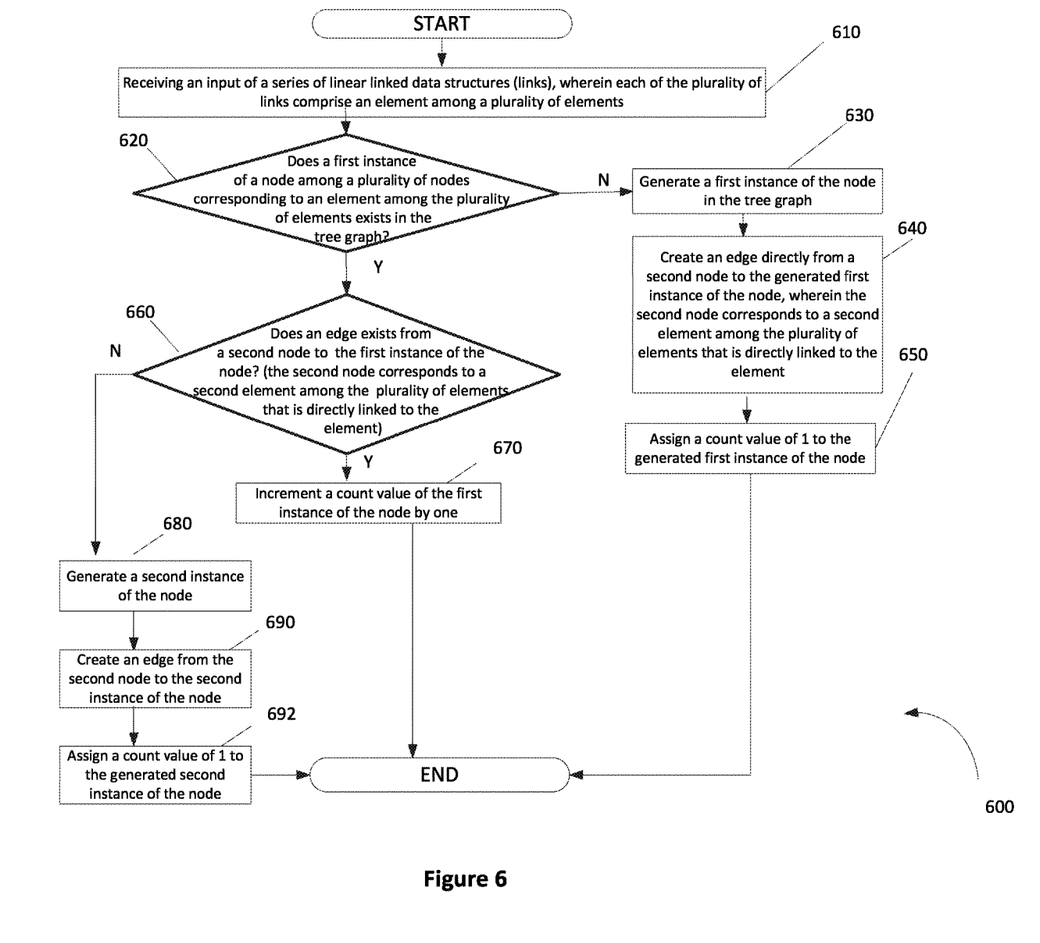
FIG. 6 illustrates a method for generating a tree graph in accordance with an implementation of the disclosure.

FIG. 6 illustrates a method 600 for generating a tree graph according to one implementation of the disclosure. Method 600 may be performed by processing logic that may comprise hardware (e.g., circuitry, dedicated logic, programmable logic, microcode, etc.), software (such as instructions run on a processing device), or a combination thereof. In one implementation, the method 600 is performed by the processing device 102 of FIG. 1.

Method 600 begins at block 610 where an input of a series of linear linked data structures (links) are received such that each of the plurality of links comprise an element among a plurality of elements. As discussed above a linear linked data structure is a linear collection of a group of data trace elements (elements), called nodes, each pointing to the next node. Each node is composed of data and a link to the next node in a sequence. Also, as discussed above, each of the elements in the link contain its own data and is directly connected to another element in the link. At block 620, it is determined whether a first instance of a node among the plurality of nodes corresponding to an element among a plurality of elements exists in a tree graph. In one implementation, each of the elements in each of the series of the links is linearly scanned to determine whether a node or an instance of the node exists in the memory for each of the corresponding elements in each of the links. At block 630, a first instance of the node is generated in a tree graph when at block 620 it is determined that the first instance of a node among the plurality of nodes corresponding to an element among a plurality of elements does not exists in a tree graph. The tree graph includes at least a root (parent) node. The tree graph may or may not include other nodes besides the root node.

At block 640, an edge is created directly from a second node to the generated first instance of the node, wherein the second node corresponds to a second element among the plurality of elements that is directly linked to the element. In one implementation, the second node is the ancestor to the generated first instance of the node. An edge is a direct link originating from the second node to the generated first instance of the node. The generated first instance of the node is a child node, which is the descendant to the parent node. As discussed above, each of the nodes in the tree graph correspond to an element in the link. As such, the first instance of the node (child node), corresponds to an element in the link, and the second node (parent node) corresponds to another element in the link. The element and the another element are directly connected to each other in the link. In one implementation, a corresponding edge identifying a parent-child relationship of the generated first instance of the node is stored in the first instance of the node. At block 650, a count value of 1 is assigned to the generated first instance of the node. When at block 620 it is determined that first instance of a node among the plurality of nodes corresponding to an element among a plurality of elements does exist in the tree graph, then at block 660, it is determined whether an edge exists from a second node to the first instance of the node. At block 670, a count value of the first instance of the node is incremented by one when at block 660 it is determined that the edge exists from a second node to the first instance of the node. In one implementation, the tree graph is not edited or updated. At block 680, a second instance of the node is generated when at block 660 it is determined that the edged does not exist from the second node to the first instance of the node. At block 690, an edge is created from the second node to the second instance of the node. At block 692, a count value of 1 is assigned to the generated second instance of the node.

In one implementation, the tree graph is traversed to identify the edge for each of a plurality of nodes in the tree graph. In one implementation, pluralities of adjacency lists are generated based on the traversal of the tree graph. Each of the plurality of adjacency lists includes identification of one or more nodes among the plurality of nodes and the corresponding depth value of the one or more nodes. The one or more nodes include one of a root node, the parent node, or the child node.

In one implementation, each of the plurality of adjacency lists are sorted based on information associated with each of the one or more nodes. The information includes the parent child relationship of each of the plurality of nodes, the count value of each of the plurality of nodes and the name identifier of each of the plurality of nodes. In one implementation, an adjacency graph is generated based on the plurality of sorted adjacency lists.

Figure 7:
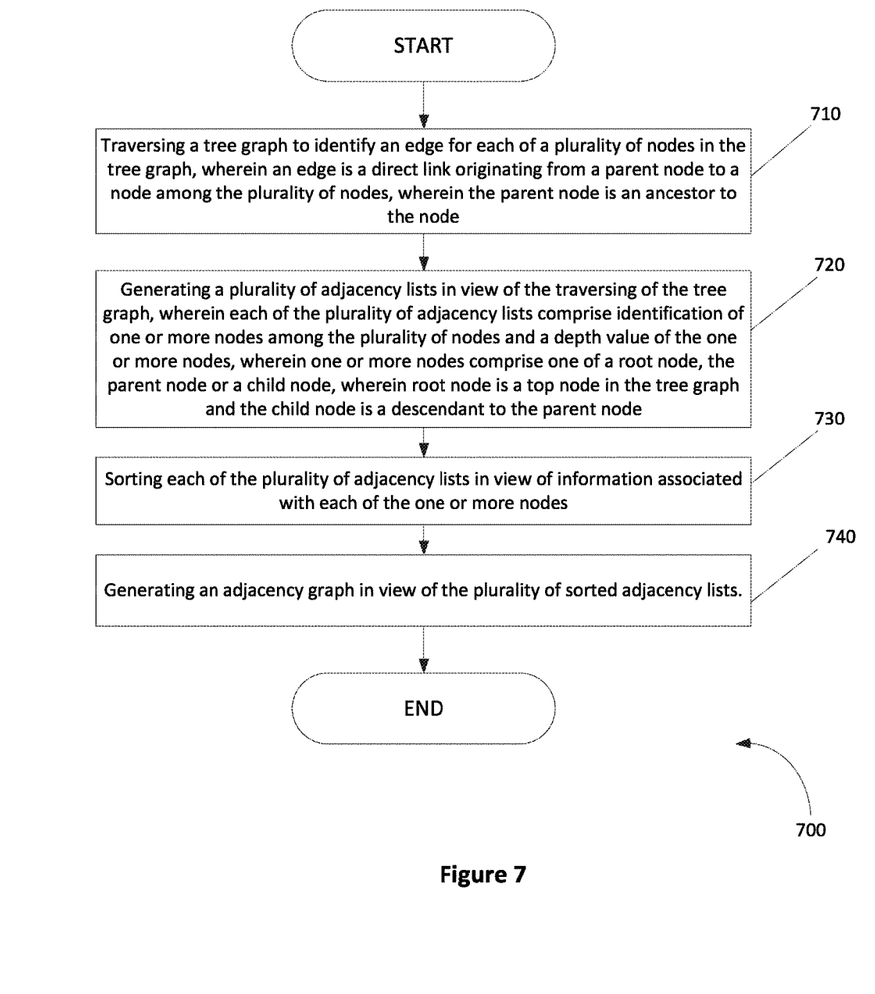
FIG. 7 illustrates a method for generating an adjacency graph in accordance with an implementation of the disclosure.

FIG. 7 illustrates a method 700 for generating an adjacency graph according to one implementation of the disclosure. Method 700 may be performed by processing logic that may comprise hardware (e.g., circuitry, dedicated logic, programmable logic, microcode, etc.), software (such as instructions run on a processing device), or a combination thereof. In one implementation, method 700 is performed by the processing device 102 of FIG. 1.

Method 700 begins at block 710 where a tree graph is traversed to identify an edge for each of a plurality of nodes in the tree graph. An edge is a direct link originating from a parent node to a node among the plurality of nodes. In one implementation, the parent node is the ancestor to the node. In one implementation, the node is a child node, which is a descendant to the parent node. The edge identifies a parent-child relationship of the node.

At block 720, a plurality of adjacency lists are generated in view of the traversing of the tree graph. Each of the plurality of adjacency lists includes identification of one or more nodes among the plurality of nodes and a corresponding depth value of the one or more nodes. The one or more nodes include one of a root node, the parent node, or a child node. The root node is a top node in the tree graph and the child node is a descendant to the parent node.

At block 730, each of the plurality of adjacency lists are sorted in view of information associated with each of the one or more nodes. The information includes the parent child relationship of each of the plurality of nodes, the count value of each of the plurality of nodes and the name identifier of each of the plurality of nodes. At block 740, an adjacency graph is generated in view of the plurality of sorted adjacency lists.

Figure 8:
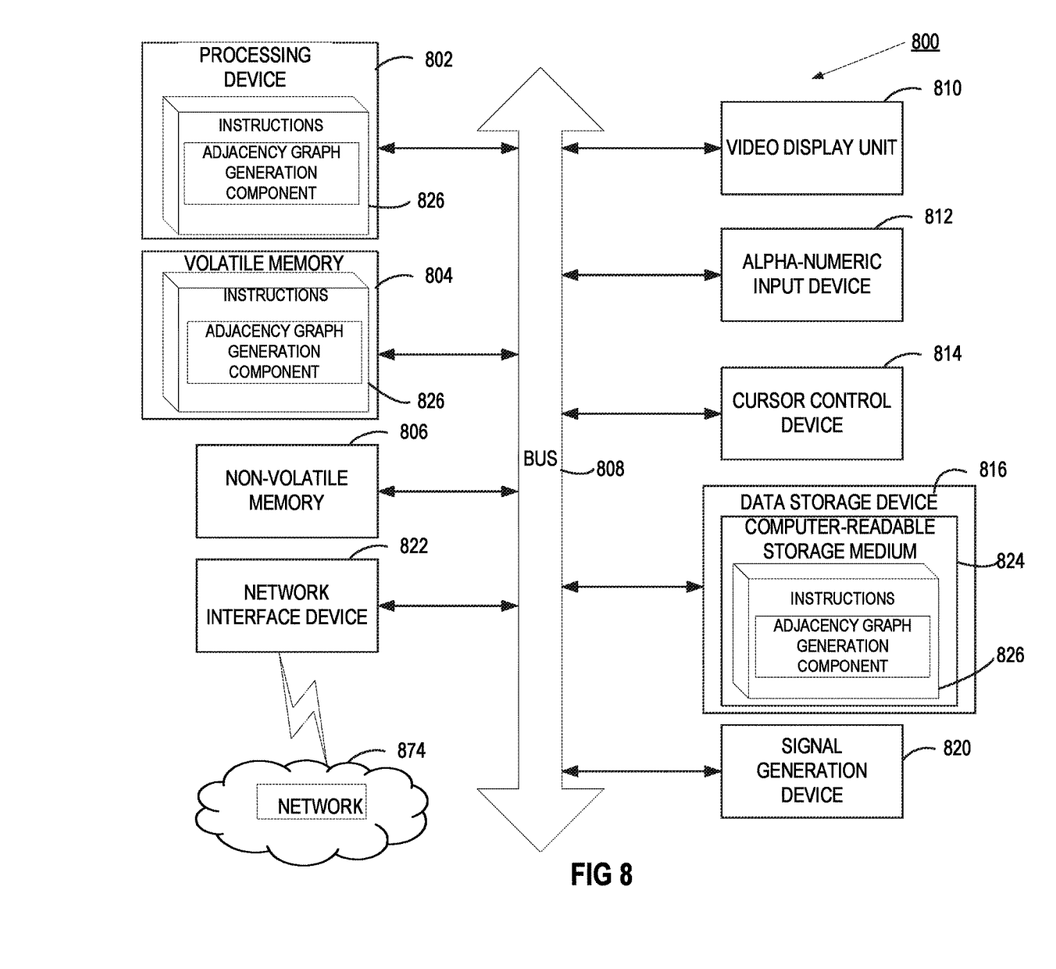
FIG. 8 illustrates a block diagram of one implementation of a computer system.

FIG. 8 depicts a block diagram of an illustrative computing device operating in accordance with the examples of the disclosure. In various illustrative examples, computer system 800 may correspond to a processing device within system 100 of FIG. 1. In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for binding data to a network in the presence of an entity.

In a further aspect, the computer system 800 may include a processing device 802 (which may correspond to processing device 102), a volatile memory 804 (e.g., random access memory (RAM)), a non-volatile memory 806 (e.g., read-only memory (ROM) or electrically-erasable programmable ROM (EEPROM)), and a data storage domain 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alpha-numeric input device 812 (e.g., a keyboard), a cursor control device 814 (e.g., a mouse), and a signal generation device 820.

Data storage domain 816 may include a non-transitory computer-readable storage medium 824 on which may store instructions 826 encoding any one or more of the methods or functions described herein, including instructions encoding the techniques including the adjacency graph generation component of FIG. 1 for implementing method 600 of FIG. 6 and method 700 of FIG. 7 for the generation of an adjacency graph from a series of linear liked data structures.

Instructions 826 may also reside, completely or partially, within volatile memory 804 and/or within processing device 802 during execution thereof by computer system 800, hence, volatile memory 804, and processing device 802 may also constitute machine-readable storage media.

While non-transitory computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer, that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs, or similar devices. In addition, firmware modules or functional circuitry within hardware devices may implement the methods, components, and features of the disclosure. Further, the methods, components, and features may be implemented in any combination of hardware devices and computer program components, or in computer programs.

Unless specifically stated otherwise, terms such as "receiving," "determining," "creating," "generating," "assigning," "traversing," "incrementing," "sorting," "associating," "sending," "transmitting" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 600 and 700 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
   receiving, by a processing device, an input of a series of linear linked data structures (links), wherein each of the series of links comprise an element among a plurality of elements;
   determining whether a first instance of a node among a plurality of nodes corresponding to a first element among the plurality of elements exists in a tree graph, wherein the links that comprise a same ordered sequence of elements of the plurality of elements are mapped to a same node of the plurality of nodes;
   in response to determining that the first instance does not exist in the tree graph, generating, by the processing device, the first instance of the node in the tree graph;
   assigning a count value of one to the generated first instance of the node, wherein the count value comprises a number of the plurality of elements mapped to the node;
   creating an edge directly from a second node to the generated first instance of the node in the tree graph, wherein the second node corresponds to a second element among the plurality of elements that is directly linked to the first element; and
   generating a plurality of adjacency lists in view of traversal of the tree graph, the plurality of adjacency lists sorted to generate an adjacency graph.

2. The method of claim 1 further comprising:
   in response to determining that the first instance of the node among the plurality of nodes does exist in the tree graph, determining whether an edge exists from the second node to the first instance of the node.

3. The method of claim 2 wherein in response to the determining that the edge exists from the second node to the first instance of the node, incrementing the count value of the first instance of the node by one.

4. The method of claim 2 wherein in response to determining that the edge does not exist from the second node to the first instance of the node, generating a second instance of the node.

5. The method of claim 4 further comprising creating an edge from the second node to the second instance of the node.

6. The method of claim 5 further comprising assigning the count value of one to the generated second instance of the node.

7. The method of claim of 1 wherein the edge is a direct link originating from the second node to the first instance of the node.

8. A system comprising:
   a memory; and
   a processing device coupled to the memory to:
      receive an input of a series of linear linked data structures (links), wherein each of the series of links comprise an element among a plurality of elements;
      associate each of the plurality of elements with a node among a plurality of nodes in a tree graph, wherein the links that comprise a same ordered sequence of elements of the plurality of elements are mapped to a same node of the plurality of nodes;
      assigning a count value to each of the plurality of nodes, wherein the count value comprises a number of the plurality of elements mapped to each of the plurality of nodes;
      traverse the tree graph to identify an edge for each of the plurality of nodes in the tree graph, wherein the edge is a direct link originating from a parent node to the node among the plurality of nodes, wherein the parent node is an ancestor to the node; and
      generate a plurality of adjacency lists in view of the traversing of the tree graph, wherein each of the plurality of adjacency lists comprise identification of one or more nodes among the plurality of nodes and a depth value of the one or more nodes, wherein the one or more nodes comprise one of a root node, the parent node or a child node, wherein the root node is a top node in the tree graph and the child node is a descendant to the parent node;
      wherein the plurality of adjacency lists are sorted to generate an adjacency graph.

9. The system of claim 8 wherein the depth value is a distance between each of the plurality of nodes and the root node.

10. The system of claim 9 wherein the processing device to:
    sort each of the plurality of adjacency lists in view of information associated with each of the one or more nodes, wherein the information comprising one of a parent child relationship of each of the plurality of nodes, the count value of each of the plurality of nodes and a name identifier of each of the plurality of nodes.

11. The system of claim 10 wherein the parent child relationship identifies the parent node of each of the plurality of nodes, wherein each of the plurality of nodes do not include the root node, wherein the root node does not include the parent node.

12. The system of claim 10 wherein the name identifier is an identification uniquely assigned to each of the plurality of the nodes.

13. The system of claim 10 wherein the count value is a total number of each of the plurality of nodes.

14. The system of claim 10 wherein the processing device to:
    generate the adjacency graph in view of the plurality of sorted adjacency lists.

15. A non-transitory computer readable storage medium comprising:

traversing a tree graph to identify an edge for each of a plurality of nodes in the tree graph, wherein an edge is a direct link originating from a parent node to a node among the plurality of nodes, wherein the parent node is an ancestor to the node, and wherein a count value is assigned to each of the plurality of nodes, wherein the count value comprises a number of the plurality of elements mapped to each of the plurality of nodes, wherein links in the tree graph that comprise a same ordered sequence of elements of the plurality of elements are mapped to a same node of the plurality of nodes;

generating a plurality of adjacency lists in view of the traversing of the tree graph, wherein each of the plurality of adjacency lists comprise identification of one or more nodes among the plurality of nodes and a depth value of the one or more nodes, wherein the one or more nodes comprise one of a root node, the parent node or a child node, wherein the root node is a top node in the tree graph and the child node is a descendant to the parent node;

sorting each of the plurality of adjacency lists in view of information associated with each of the one or more nodes; and generating an adjacency graph in view of the plurality of sorted adjacency lists.

16. The non-transitory computer readable storage medium of claim 15 wherein the depth value is a distance between each of the plurality of nodes and the root node.

17. The non-transitory computer readable storage medium of claim 16 wherein the information comprises a parent child relationship identifying the parent node of each of the plurality of nodes.

18. The non-transitory computer readable storage medium of claim 16, wherein the information comprise a name identifier uniquely identifying each of the plurality of the nodes.

19. The non-transitory computer readable storage medium of claim 16 wherein the information comprise the count value of total number of each of the plurality of nodes.

20. The non-transitory computer readable storage medium of claim 15 wherein the edge is a direct link originating from the second node to the first instance of the node.

* * * * *